(12) United States Patent
Kariya et al.

(10) Patent No.: US 8,900,506 B2
(45) Date of Patent: Dec. 2, 2014

(54) PLASTICIZING SCREW FOR INJECTION MOLDING AND INJECTION MOLDING METHOD USING SAME

(75) Inventors: Toshihiko Kariya, Nagoya (JP); Naoki Toda, Nagoya (JP); Munehiro Nobuta, Nagoya (JP)

(73) Assignee: Mitsubishi Heavy Industries Plastic Technology, Nagoya-shi (JP)

( * ) Notice: Subject to any disclaimer, the term of this patent is extended or adjusted under 35 U.S.C. 154(b) by 142 days.

(21) Appl. No.: 13/805,583

(22) PCT Filed: Oct. 25, 2010

(86) PCT No.: PCT/JP2010/068824
§ 371 (c)(1),
(2), (4) Date: Dec. 19, 2012

(87) PCT Pub. No.: WO2012/056505
PCT Pub. Date: May 3, 2012

(65) Prior Publication Data
US 2013/0099421 A1 Apr. 25, 2013

(51) Int. Cl.
*B29C 45/60* (2006.01)
*B29C 45/00* (2006.01)
*B29C 45/47* (2006.01)

(52) U.S. Cl.
CPC ............. *B29C 45/47* (2013.01); *B29C 45/0005* (2013.01); *B29C 45/60* (2013.01)
USPC .......... 264/328.18; 264/349; 366/88; 366/90; 425/208; 425/587

(58) Field of Classification Search
CPC ...... B29C 45/60; B29C 47/62; B29C 47/622; B29C 45/0005; B29C 45/47
USPC ............. 264/328.18, 349; 425/207, 208, 587; 366/81, 88, 90
See application file for complete search history.

(56) References Cited

U.S. PATENT DOCUMENTS 3,368,724 A * 2/1968 Reifenhauser et al. ....... 222/413
3,867,079 A * 2/1975 Kim .............................. 425/208
(Continued)

FOREIGN PATENT DOCUMENTS

CN 1036922 A 11/1989
CN 201272005 Y 7/2009
(Continued)

OTHER PUBLICATIONS

Office Action dated Jun. 5, 2014, issued in Corresponding Chinese Patent Application No. 201080067542.0, with English Translation (11 pages).
(Continued)

*Primary Examiner* — Jill Heitbrink
(74) *Attorney, Agent, or Firm* — Westerman, Hattori, Daniels & Adrian, LLP

(57) ABSTRACT

A plasticizing screw for injection molding according to the present invention is installed in an injection molding machine that performs injection molding by plasticizing thermoplastic resin feedstock containing reinforcement fibers, and includes a shaft, a main flight, and a sub-flight. The protrusion height of the main flight from the circumferential surface of the shaft is formed to be constant in at least an area in which the sub-flight is provided. The sub-flight includes a flat surface portion which is provided on the rear end side in a winding direction and in which a protrusion height from the circumferential surface of the shaft is lower than that of the main flight and is constant, and an inclined surface portion which is provided to extend continuously from a leading end in the winding direction of the flat surface portion and in which a protrusion height from the circumferential surface of the shaft gradually increases toward the leading end side in the winding direction and is less than the protrusion height of the main flight.

7 Claims, 7 Drawing Sheets

(56) References Cited

U.S. PATENT DOCUMENTS

| | | | |
|---|---|---|---|
| 5,088,914 A * | 2/1992 | Brambilla | 425/208 |
| 5,141,326 A * | 8/1992 | Eshima | 366/88 |

FOREIGN PATENT DOCUMENTS

| | | |
|---|---|---|
| EP | 2 204 272 A1 | 7/2010 |
| JP | 55-219 B2 | 1/1980 |
| JP | 61-141523 A | 6/1986 |
| JP | 61-222707 A | 10/1986 |
| JP | 62-103122 A | 5/1987 |
| JP | 62-147516 U | 9/1987 |
| JP | 62-299324 A | 12/1987 |
| JP | 63-122513 A | 5/1988 |
| JP | 64-56517 A | 3/1989 |
| JP | 04-31021 A | 2/1992 |
| JP | 04-45862 Y2 | 10/1992 |
| JP | 06-012014 U | 2/1994 |
| JP | 08-103926 A | 4/1996 |
| JP | 08-281740 A | 10/1996 |
| JP | 2561781 Y2 | 2/1998 |
| JP | 2000-202878 A | 7/2000 |
| JP | 3170757 B2 | 5/2001 |
| JP | 2002-234063 A | 8/2002 |
| JP | 2002-283421 A | 10/2002 |
| JP | 3564755 B2 | 9/2004 |

OTHER PUBLICATIONS

International Search Report of PCT/JP2010/068824, date of mailing date Nov. 22, 2010 with English translation (4 pages).

Written Opinion dated Nov. 22, 2010, issued in corresponding International Patent Application No. PCT/JP2010/068824, with English translation (8 pages).

Extended European Search Report dated Aug. 21, 2014, issued in European Patent Application No. 10858897.1 (7 pages).

Japanese Notice of Allowance dated Oct. 7, 2014, issued in corresponding JP application No. 2012-540550 with English Translation.

* cited by examiner

FIG. 7

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | COMPARATIVE EXAMPLE 1 | COMPARATIVE EXAMPLE 2 |
|---|---|---|---|---|---|---|---|---|---|---|---|---|
| REINFORCEMENT FIBER | TYPE | GLASS | GLASS | CARBON | GLASS | GLASS | GLASS | GLASS | GLASS | GLASS | GLASS | GLASS |
| | REINFORCEMENT FIBER CONTENT RATIO (% BY WEIGHT) | 20 | 30 | 20 | 20 | 20 | 20 | 20 | 20 | 20 | 20 | 20 |
| | FIBER LENGTH (mm) | 10 | 10 | 10 | 10 | 20 | 25 | 10 | 10 | 10 | 10 | 10 |
| FEEDSTOCK PREHEATING | | ABSENT | ABSENT | ABSENT | PRESENT | ABSENT | ABSENT | ABSENT | ABSENT | ABSENT | ABSENT | ABSENT |
| FLAT SURFACE PORTION | | PRESENT | PRESENT | PRESENT | PRESENT | PRESENT | PRESENT | PRESENT | PRESENT | PRESENT | ABSENT | ABSENT |
| DIFFERENCE IN PROTRUSION HEIGHT BETWEEN MAIN FLIGHT AND FLAT SURFACE PORTION (mm) | | 3 | 3 | 3 | 3 | 3 | 3 | 2 | 1.5 | 1 | — | — |
| WEIGHT-AVERAGE FIBER LENGTH (mm) | | 2 | 2 | 2.1 | 2.3 | 2.3 | 2.3 | 2 | 1.8 | 1 | 0.8 | 0.5 |
| DEGREE OF DISPERSION OF FIBERS | | A | A | A | A | A | A | A | A | A | A | A |

PLASTICIZING SCREW FOR INJECTION MOLDING AND INJECTION MOLDING METHOD USING SAME

TECHNICAL FIELD

The present invention relates to a plasticizing screw for injection molding in which a main flight and a sub-flight are provided to protrude on the circumferential surface of a shaft, and an injection molding method using the plasticizing screw for injection molding.

BACKGROUND ART

An injection molding machine which melts feedstock composed of thermoplastic resin and injects it into a mold is constituted to include a screw which is accommodated in the inside of an injection cylinder. Then, a screw with only one blade-shaped flight spirally provided on the circumferential surface of a shaft, which is rotationally driven, has been widely used as the screw. In such a screw, solid thermoplastic resin feedstock supplied to the inside of the injection cylinder is kneaded while being melted and plasticized by receiving a shear force from the screw which rotates, and then is injected into the mold.

Incidentally, as means for improving the kneadability of thermoplastic resin, a so-called double flight screw provided with two flights has been used in recent years. The double flight screw is constituted by being provided with one sub-flight having a lower height and a larger pitch than a main flight between adjacent main flights (refer to, for example, PTL 1 and PTL 2).

Here, a double flight screw disclosed in PTL 1 is formed such that the thickness of the gap between a leading end of a sub-flight and the inner wall surface of an injection cylinder has a constant magnitude. On the other hand, a double flight screw disclosed in PTL 2 is formed such that a difference in the outer diameter between a main flight and a sub-flight gradually decreases toward the leading end side of the sub-flight, that is, such that the thickness of the gap between the leading end of the sub-flight and the inner wall surface of the injection cylinder gradually decreases toward the leading end side of the screw.

CITATION LIST

Patent Literature

[PTL 1] Japanese Patent Application, First Publication No. 2002-283421
[PTL 2] Japanese Utility Model Application, First Publication No. S62-147516

SUMMARY OF INVENTION

Technical Problem

However, in the double flight screws disclosed in PTL 1 and PTL 2, in a case of injection-molding thermoplastic resin containing reinforcement fibers for improving mechanical characteristics, a problem arises in the quality of a molded product.

To describe in more detail, the double flight screw disclosed in PTL 1 is formed such that the thickness of the gap between the leading end of the sub-flight and the inner wall surface of the injection cylinder has a constant magnitude, as described above. Therefore, if the gap thickness is set to be small, since immediately after thermoplastic resin that is feedstock is input from a feedstock input port (a hopper) at a screw rear end portion, softening of the thermoplastic resin is insufficient, the gap between the leading end portion in a radial direction of the sub-flight and the inner wall surface of the injection cylinder is clogged with the thermoplastic resin, whereby defective plasticization occurs. Further, at the screw rear end portion where softening of the thermoplastic resin is insufficient, the thermoplastic resin cannot absorb a shear force that it receives from the screw through bending deformation. Therefore, if the thermoplastic resin is subjected to a large shear force between the leading end of the sub-flight and the inner wall surface of the injection cylinder, excessive breakage occurs in the reinforcement fibers.

In addition, the term "a screw rear end portion (or a screw rear end side)" as used in the specification of this application means an upstream portion (or an upstream side) along a transport direction of the thermoplastic resin by the screw, and the term "a screw leading end portion (or a screw leading end side)" means a downstream portion (a downstream side) along the transport direction.

On the other hand, if the gap thickness is set to be large, breakage of the reinforcement fibers at the screw rear end portion can be suppressed. However, an effective shear force or stretching force cannot be loaded to the thermoplastic resin at a screw leading end portion.

More specifically, at the screw leading end portion, in order to disaggregate or disperse a bundle of reinforcement fibers which are suspended in the thermoplastic resin in a molten state, there is a need to load a shear force and a stretching force to the thermoplastic resin in a molten state between the leading end portion in the radial direction of the sub-flight and the inner wall surface of the injection cylinder. However, since at the screw leading end portion, the temperature of the thermoplastic resin rises, and thus the thermoplastic resin is sufficiently softened, if the gap thickness is set to be large, the thermoplastic resin absorbs a shear force or a stretching force loaded by the screw. In this way, an effective shear force or stretching force cannot be loaded from the screw to the thermoplastic resin. Therefore, defective disaggregation or defective dispersion occurs in the reinforcement fibers contained in the thermoplastic resin.

Further, the double flight screw disclosed in PTL 2 is formed such that the thickness of the gap between the leading end portion in the radial direction of the sub-flight and the inner wall surface of the injection cylinder gradually decreases toward the leading end side of the screw, as described above. In this way, compared to the double flight screw disclosed in PTL 1, there is the effect of simultaneously suppressing breakage of the reinforcement fibers at the screw rear end portion and defective disaggregation of the reinforcement fibers at the screw leading end portion. However, in the double flight screw disclosed in PTL 2, there is a defect that if a melting start position of the thermoplastic resin changes, variation occurs in the quality of melted thermoplastic resin.

More specifically, there is a case where the melting start position of the thermoplastic resin is shifted to the screw leading end side (Case 1) or shifted to the screw rear end side (Case 2) depending on the type of resin or an external disturbance such as a change in the operating condition (the molding condition) of the screw or an environmental condition. Then, in Case 1, compared to a case where there is no shift, the height of the sub-flight that the thermoplastic resin which has started to melt should flow over is higher (the thickness of the gap the thermoplastic resin passes through is smaller). Therefore, a shear force which is loaded to the thermoplastic resin when getting over the sub-flight increases, and thus breakage of the reinforcement fibers increases.

On the other hand, in Case 2, compared to a case where there is no shift, the height of the sub-flight that the thermoplastic resin which has started to melt should flow over is lower (the thickness of the gap where the thermoplastic resin passes therethrough is larger). Therefore, since a shear force which is loaded to the thermoplastic resin when getting over the sub-flight is reduced, breakage of the reinforcement fibers is reduced. However, the degrees of disaggregation and dispersion of the reinforcement fibers decreases.

In this manner, since differences occur in the breakage state and the disaggregation and dispersion states of the reinforcement fibers due to a change in the melting start position of the thermoplastic resin, variation occurs in the quality of melted thermoplastic resin.

The present invention has been made in view of such circumstances and has an object of providing a double flight screw in which when injection-molding thermoplastic resin containing reinforcement fibers, excessive breakage, defective disaggregation, and defective dispersion does not occur in the reinforcement fibers.

Solution to Problem

A plasticizing screw for injection molding according to the invention is installed in an injection molding machine which performs injection molding by plasticizing thermoplastic resin feedstock containing reinforcement fibers, and includes a shaft which is rotationally driven, a main flight spirally provided on the circumferential surface of the shaft, and a sub-flight spirally provided on the circumferential surface of the shaft and in a groove portion of the main flight.

The protrusion height of the main flight from the circumferential surface of the shaft is formed to be constant in at least an area in which the sub-flight is provided. The sub-flight includes a flat surface portion and an inclined surface portion. The flat surface portion is provided on the screw rear end side along a winding direction, and the protrusion height thereof from the circumferential surface of the shaft is lower than the protrusion height of the main flight and is constant. The inclined surface portion is provided so as to extend continuously from an end portion on the screw leading end side along the winding direction of the flat surface portion, and the protrusion height thereof from the circumferential surface of the shaft gradually increases toward a leading end side in the winding direction and is less than the protrusion height of the main flight.

According to such a configuration, at the rear end side in the winding direction of the plasticizing screw for injection molding (simply referred to as the "screw"), a wide gap having a constant thickness is secured between the inner wall surface of an injection cylinder which accommodates the screw and the flat surface portion of the sub-flight. Here, in the double flight screw in the related art described above, if the melting start position of the thermoplastic resin is on the screw leading end side depending on the type of resin or the operation condition of the screw, softening of the thermoplastic resin is insufficient in a wide area in the winding direction, and thus, if a large shear force is loaded to the reinforcement fiber contained in the thermoplastic resin, breakage of the reinforcement fibers increases. Alternatively, if the melting start position of the thermoplastic resin changes to the screw leading end side or the screw rear end side depending on external disturbance such as an environmental condition, there is a defect in which variation occurs in the quality of melted thermoplastic resin. However, even in this case, since the thermoplastic resin in which softening is insufficient passes through the wide gap having a constant thickness secured on the rear end side in the winding direction, even if the melting start position of the thermoplastic resin changes to the screw leading end side or the screw rear end side depending on external disturbance such as an environmental condition, a difference does not occur in the height of the sub-flight that the thermoplastic resin which has started to melt should flow over. Therefore, in addition to being able to prevent occurrence of excessive breakage in the reinforcement fibers contained in the thermoplastic resin, occurrence of variation in quality such as disaggregation and dispersion of the reinforcement fibers in the melted thermoplastic resin can be suppressed.

Further, the thermoplastic resin which has started to melt at the screw leading end portion passes through the inclined surface portion having a gradually increasing protrusion height. Of these, since the thermoplastic resin having a relatively low temperature and high viscosity immediately after input from a hopper passes through an area in which a protrusion height is low, of the inclined surface portion, the thermoplastic resin is not subjected to a strong shear force, and thus occurrence of excessive breakage in the reinforcement fibers can be prevented. Further, since the thermoplastic resin having relatively high temperature and low viscosity due to thermal energy being sufficiently applied during transportation to the leading end side of the screw passes through an area in which a protrusion height is high and a gap thickness is small, of the inclined surface portion, effective shear force and stretching force are loaded to the inclusion of the thermoplastic resin. In this way, disaggregation or dispersion of the reinforcement fibers contained in the thermoplastic resin is promoted.

In the plasticizing screw for injection molding according to the invention, it is preferable that a difference in protrusion height between the main flight and the flat surface portion of the sub-flight has a magnitude greater than or equal to a weight-average fiber length of the reinforcement fiber needed for a molded product.

According to such a configuration, in a case where a leading end of the main flight is at a position close to the inner wall surface of the injection cylinder, the reinforcement fibers each having a fiber length near a weight-average fiber length needed for a molded product can pass through the gap between the inner wall surface of the injection cylinder and the flat surface portion of the sub-flight without being bent. In this way, occurrence of excessive breakage in the reinforcement fibers can be prevented, and thus a distribution state of residual fiber lengths in a molded product can be attained in which a molded product having a needed weight-average fiber length is provided.

In the plasticizing screw for injection molding according to the invention, a steep slope area in which the ratio at which a protrusion height increases is larger than in other areas may be provided at a rear end portion in the winding direction of the inclined surface portion.

According to such a configuration, even if the flat surface portion is formed low, and thus a wide gap is provided between the flat surface portion and the inner wall surface of the injection cylinder, the thickness of the gap between the inner wall surface of the injection cylinder and the inclined surface portion of the sub-flight starts to become thin from the further rear end side in the winding direction, compared to a case where there is no steep slope area, and also the thickness becomes thin as a whole. Therefore, effective shear force and stretching force are early loaded to the thermoplastic resin which has started to melt. In this way, even in resin in which melting rapidly proceeds in the vicinity of a melting point, and thus the viscosity of resin rapidly decreases, especially like a crystalline resin, that is, resin in which the hardness of resin rapidly and considerably changes before and after the start of melting, since it is possible to make resin having low viscosity after melting pass through the inclined surface portion having a thin gap, while making (hard) resin in which softening is insufficient before the start of melting pass through the flat surface portion having a wide gap, disaggregation or dispersion of the reinforcement fibers is further promoted. In addition, it is preferable that the steep slope area be provided at a connection portion with the flat surface portion in the inclined surface portion. However, the steep slope area may also be provided at an intermediate portion in the winding direction of the inclined surface portion.

In addition, as the crystalline resin, for example, (1) polyolefin-based resin such as polyethylene, polypropylene, or polybutene, (2) polyvinyl chloride-based resin, or aliphatic polyamide-based resin such as nylon 6 or nylon 66, (3) aromatic polyamide-based resin such as polyphthalamide, (4) polyester-based resin such as polyethylene terephthalate or polybutylene terephthalate, (5) polyoxymethylene-based resin, polyether ketone-based resin, fluorine-based resin, or organism-derived resin such as polylactic acid, or the like can be applied.

An injection molding method according to the invention includes a process of plasticizing thermoplastic resin feedstock containing reinforcement fibers by using a plasticizing screw for injection molding, and a process of injecting the plasticized thermoplastic resin feedstock into a cavity of a mold.

The plasticizing screw for injection molding includes a shaft which is rotationally driven, a main flight spirally provided on the circumferential surface of the shaft, and a sub-flight spirally provided on the circumferential surface of the shaft and in a groove portion of the main flight.

The protrusion height of the main flight from the circumferential surface of the shaft is formed to be constant in at least an area in which the sub-flight is provided. The sub-flight includes a flat surface portion and an inclined surface portion. The flat surface portion is provided on a rear end side in a winding direction, and the protrusion height thereof from the circumferential surface of the shaft is lower than the protrusion height of the main flight and is constant. The inclined surface portion is provided so as to extend continuously from a leading end in the winding direction of the flat surface portion, and the protrusion height thereof from the circumferential surface of the shaft gradually increases toward a leading end side in the winding direction and is less than the protrusion height of the main flight.

According to such a method, at the axially rear end side of the plasticizing screw for injection molding, a wide gap having a constant width is secured between the inner wall surface of the injection cylinder which accommodates the screw and the flat surface portion of the sub-flight. Accordingly, even if the melting start position of the thermoplastic resin changes to the screw leading end side or the screw rear end side depending on external disturbance such as an environmental condition, a difference does not occur in the height of the sub-flight that the thermoplastic resin which has started to melt should flow over. In this way, a molded product can be obtained in which the fiber lengths of the reinforcement fibers contained in the thermoplastic resin are long and dispersion of the reinforcement fiber lengths is good.

In the injection molding method according to the invention, the reinforcement fiber may include at least one type of a glass fiber, a carbon fiber, a metal fiber, and a natural fiber.

According to such a method, it is possible to make a molded product obtained by injection molding have thin thickness and lightweight properties, high mechanical strength, and recyclability. In particular, if a carbon fiber or a metal fiber is adopted, a reduction in weight of a molded product can be attained and also, in a case of using a molded product as an outer covering member such as a body member of a vehicle, a cover for housing electrical equipment, or the like, since conductivity can be provided to the outer covering member, the cover, or the like, it is possible to protect a passenger or the electrical equipment from a large current at the time of a lightning strike. Further, by adopting a natural fiber and combining it with, in particular, organism-derived resin such as polylactic acid, it is possible to provide a molded product with a smaller burden on the global environment.

In the injection molding method according to the invention, the thermoplastic resin feedstock may be a crystalline resin.

According to such a method, even in a crystalline resin in which melting rapidly proceeds in the vicinity of a melting point and the viscosity of resin rapidly decreases, a molded product in which the fiber lengths of the contained reinforcement fibers are long and dispersion of the reinforcement fiber lengths is good can be obtained, and also occurrence of variation in quality such as disaggregation and dispersion of the reinforcement fibers in the melted thermoplastic resin can be suppressed.

Advantageous Effects of Invention

According to the invention, when injection-molding thermoplastic resin containing reinforcement fibers, by preventing occurrence of excessive breakage, defective disaggregation, or defective dispersion in the reinforcement fibers, it is possible to attain improvement in the quality of a molded product, such as preventing variation in the strength or the weight of the molded product or improving external appearance by preventing exposure of the reinforcement fibers on the surface of the molded product.

BRIEF DESCRIPTION OF DRAWINGS

FIG. 7 is a table illustrating the test results regarding each example.

DESCRIPTION OF EMBODIMENTS (First Embodiment)

Hereinafter, embodiments of the invention will be described with reference to the drawings. First, the configuration of a plasticizing screw for injection molding according to a first embodiment of the invention will be described. FIG.

1 is a schematic diagram illustrating the overall configuration of an injection molding machine 1 provided with a plasticizing screw for injection molding 10 (hereinafter simply referred to as a "screw 10") according to the first embodiment.

Figure 1:
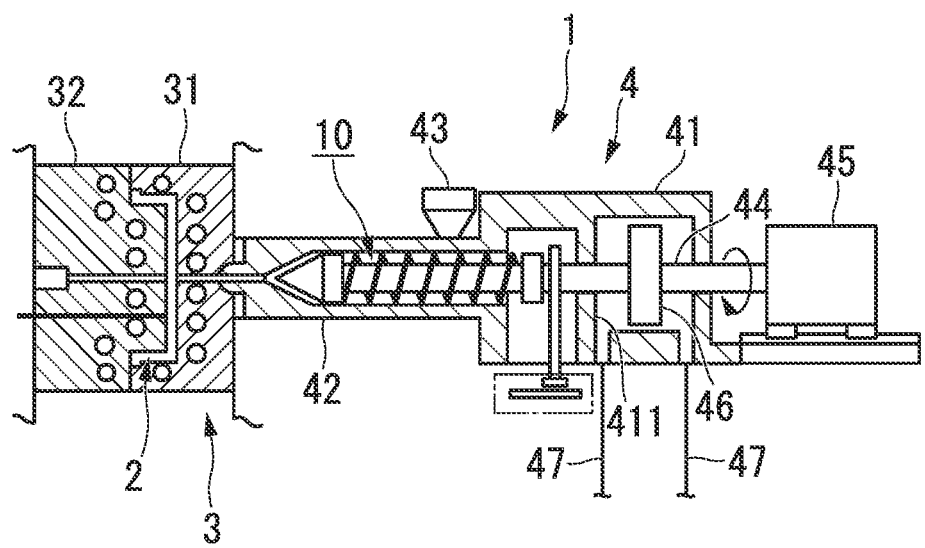
FIG. 1 is a schematic diagram illustrating the overall configuration of an injection molding machine provided with a plasticizing screw for injection molding according to a first embodiment of the invention.

The injection molding machine 1 includes a mold unit 3 with a cavity 2 formed in the inside thereof, and an injection unit 4 for injecting thermoplastic resin into the cavity 2, as shown in FIG. 1.

The mold unit 3 includes a fixed mold 31 provided immovably and a movable mold 32 provided so as to be able to move with respect to the fixed mold 31, as shown in FIG. 1. Then, the cavity 2 is formed between a concave portion of the fixed mold 31 and a convex portion of the movable mold 32 which are provided so as to face each other.

The injection unit 4 includes a unit main body 41, an injection cylinder 42, the screw 10, a hopper 43, a connecting shaft 44, a motor 45, a piston 46, and hydraulic piping 47. A hydraulic oil cylinder 411 is formed in the inside of the unit main body 41. The injection cylinder 42 extends from the unit main body 41 and a leading end portion of the injection cylinder 42 is connected to the fixed mold 31. The screw 10 is accommodated in the inside of the injection cylinder 42 and the hopper 43 is provided at an upper portion of the injection cylinder 42. The connecting shaft 44 is connected to a rear end portion of the screw 10 and the motor 45 rotationally drives the connecting shaft 44. The piston 46 is accommodated in the inside of the hydraulic oil cylinder 411 and fixed to the connecting shaft 44. The hydraulic piping 47 is connected to the hydraulic oil cylinder 411.

In the injection unit 4 constituted in this manner, the hopper 43 is filled with solid thermoplastic resin feedstock (not shown) containing reinforcement fibers such as glass fibers or carbon fibers. In this state, when the motor 45 starts the driving of the connecting shaft 44, the screw 10 connected to the connecting shaft 44 starts to rotate. Then, when the thermoplastic resin feedstock is supplied from the hopper 43 to the injection cylinder 42, the thermoplastic resin feedstock is transported to the leading end side while being melted and plasticized by the screw 10. Thereafter, when hydraulic oil (not shown) is supplied from the hydraulic piping 47 to the hydraulic oil cylinder 411, the piston 46 moves to the mold unit 3 side in the inside of the hydraulic oil cylinder 411, and accordingly, the screw 10 also moves to the mold unit 3 side in the inside of the injection cylinder 42. In this way, liquid thermoplastic resin accumulated in the leading end portion of the injection cylinder 42 is pressed and injected by the screw 10, thereby being filled in the cavity 2 of the mold unit 3. Then, after the thermoplastic resin is cooled and solidified, a molded product is taken out by separating the movable mold 32 from the fixed mold 31.

In addition, as the reinforcement fiber which is contained in the thermoplastic resin feedstock, in addition to the glass fiber or the carbon fiber, a magnesium sulfate fiber, a potassium titanate fiber, a titanium oxide fiber, a magnesium oxysulfate fiber, organic filler, an organic synthetic or natural fiber, or the like can be used.

Figure 2:
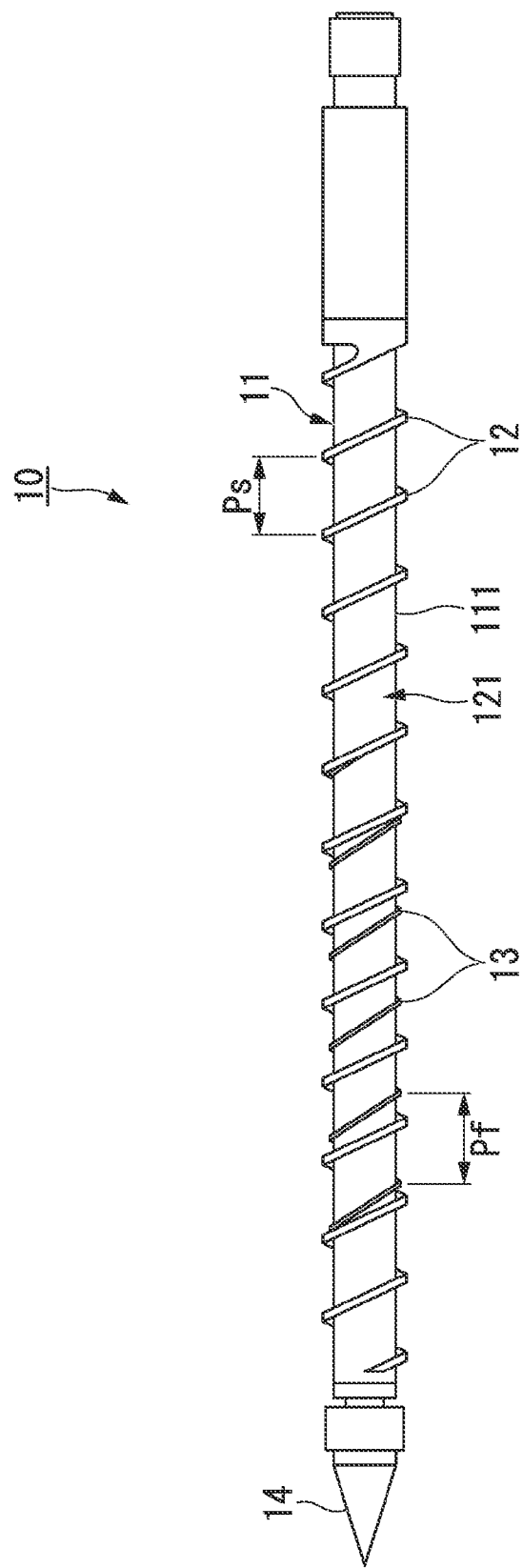
FIG. 2 is a schematic front view illustrating the external appearance of the screw according to the first embodiment.

Here, FIG. 2 is a schematic front view illustrating the external appearance of the screw 10. The screw 10 includes a shaft 11 having a long cylindrical shape, a main flight 12 provided to protrude from the shaft 11, a sub-flight 13 provided to protrude from the shaft 11 in an area of a portion of the main flight 12, and a head 14 provided at a leading end of the shaft 11.

Figure 3:
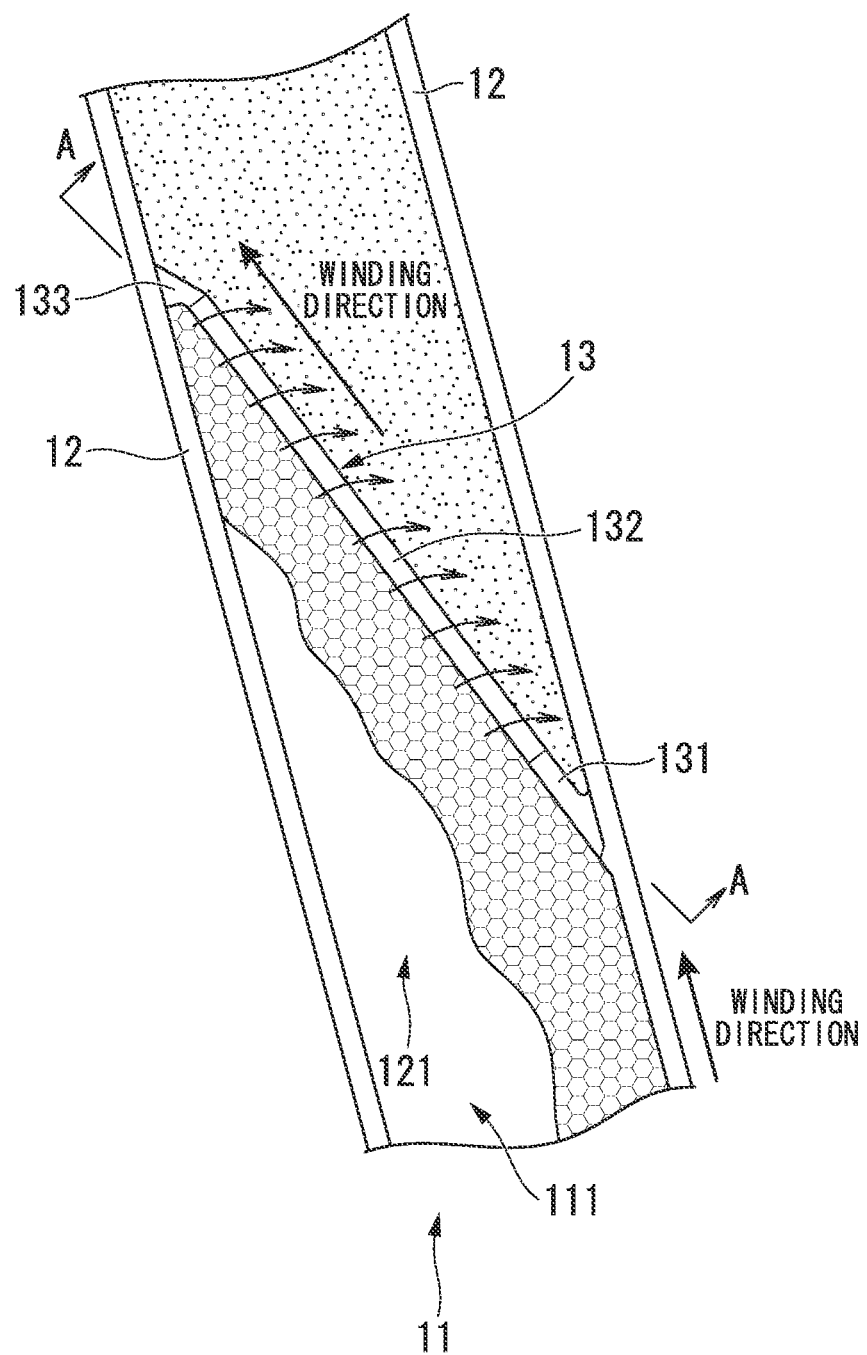
FIG. 3 is a development diagram illustrating an area provided with a sub-flight in a shaft according to the first embodiment.
Figure 4:
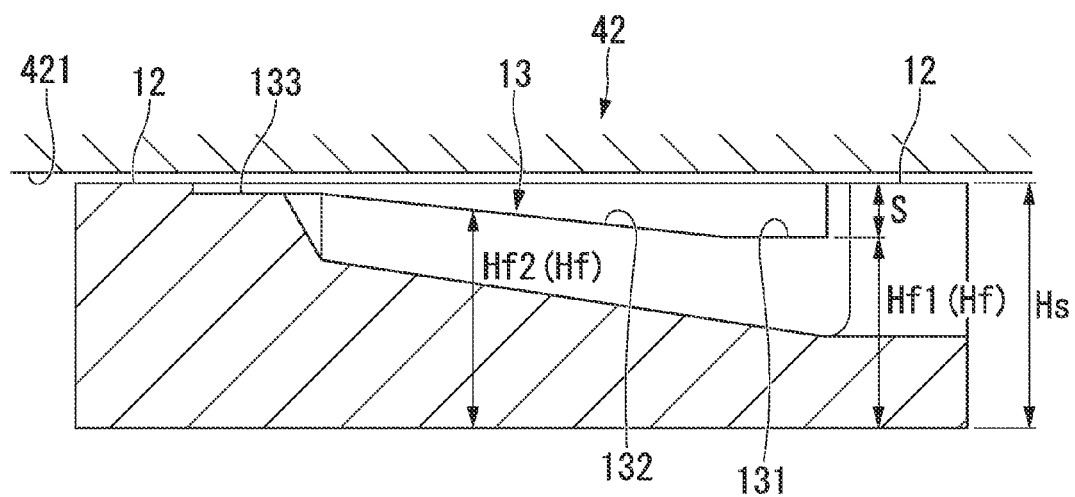
FIG. 4 is a schematic cross-sectional view illustrating an A-A cross-section in FIG. 3.

The main flight 12 is provided so as to spirally wind around a circumferential surface 111 of the shaft 11 at a pitch Ps in an area extending from a rear end portion in an axial direction of the shaft 11 to a leading end portion in the axial direction, as shown in FIG. 2. Here, FIG. 3 is a development diagram illustrating an area provided with the sub-flight 13 in the shaft 11. Further, FIG. 4 is a schematic cross-sectional view illustrating an A-A cross-section in FIG. 3. The main flight 12 is formed such that a protrusion height Hs from the circumferential surface 111 of the shaft 11 is constant over the entire length thereof, as shown in FIG. 4. Then, a leading end portion in a radial direction of the main flight 12 is located in proximity to an inner wall surface 421 of the injection cylinder 42 shown in FIG. 1.

The sub-flight 13 is provided so as to spirally wind around the circumferential surface 111 of the shaft 11 at a pitch Pf in an area on the leading end side in a winding direction of the main flight 12, as shown in FIG. 2. Here, the pitch Pf of the sub-flight 13 is set slightly larger than the pitch Ps of the main flight 12.

The sub-flight 13 is provided in a groove portion 121 of the main flight 12, as shown in FIG. 2, and a rear end in the winding direction and a leading end in the winding direction of the sub-flight 13 are connected to the main flight 12. Then, as shown in FIG. 4, a protrusion height Hf of the sub-flight 13 from the circumferential surface 111 of the shaft 11 (hereinafter simply referred to as a "protrusion height Hf") is lower than the protrusion height Hs of the main flight 12 and changes along the winding direction. More specifically, as shown in FIG. 2, the sub-flight 13 has a flat surface portion 131 provided at a rear end portion in the winding direction and an inclined surface portion 132 provided so as to extend continuously from a leading end in the winding direction of the flat surface portion 131.

The flat surface portion 131 is formed such that a protrusion height Hf1 thereof is lower than the protrusion height Hs of the main flight 12 and is constant along the winding direction, as shown in FIG. 4. Then, a difference S1 in protrusion height between the flat surface portion 131 and the main flight 12 is made to have a magnitude greater than or equal to the weight-average fiber length of a reinforcement fiber needed for a molded product. In this way, the width dimension of a gap which is formed between the flat surface portion 131 and the inner wall surface 421 of the injection cylinder 42 is made to have a magnitude greater than or equal to the weight-average fiber length of the reinforcement fiber. For example, in this embodiment, when the weight-average fiber length of the reinforcement fiber needed for a molded product is about 1.0 mm, the difference in protrusion height between the flat surface portion 131 and the main flight 12 is made to be about 1.5 mm. In addition, a definition of the weight-average fiber length in this specification will be described in the description of examples to be described later.

The inclined surface portion 132 is formed such that a protrusion height Hf2 thereof is lower than the protrusion height Hs of the main flight 12 and gradually increases along the winding direction, as shown in FIG. 4. In this embodiment, as shown in FIG. 4, the cross-sectional shape of the inclined surface portion 132 is formed in a straight line shape linearly rising from the same height position as the flat surface portion 131 to a position slightly lower than a leading end in the radial direction of the main flight 12. Further, as shown in FIGS. 3 and 4, a connection area 133 having a constant protrusion height is provided at a portion which is connected to the main flight 12 in a leading end portion in the winding direction of the inclined surface portion 132.

In addition, an area in which the sub-flight 13 is provided, in the groove portion 121 of the main flight 12, is not limited to an area shown in FIG. 2 and can be any area along the axial direction of the shaft 11. Further, the ratio between the flat surface portion 131 and the inclined surface portion 132 which constitute the sub-flight 13 is not limited to the ratio shown in FIG. 3 and a design change can be made appropriately. In addition, the cross-sectional shape of the inclined surface portion 132 is not limited to a straight line shape as in this embodiment and may also be formed in a curved line shape gradually rising along the winding direction.

Next, description will be performed with regard to a procedure for an injection molding method using the screw 10 according to the first embodiment of the invention and the operation and effects thereof. With the rotation of the screw 10 of the first embodiment, the solid thermoplastic resin feedstock supplied to the injection cylinder 42 is transported to the axially leading end side while being melted and plasticized by a shear force that it receives from the screw 10. Here, the position where the thermoplastic resin feedstock starts to melt changes to the axially leading end side or the axially rear end side of the screw 10 depending on the type of the thermoplastic resin feedstock which is supplied, or on an external disturbance such as a change in the operating condition of the screw 10 or an environmental condition.

Here, the thermoplastic resin feedstock which has started to melt at the leading end portion in the axial direction of the screw 10 passes through the inclined surface portion 132 in which the protrusion height Hf2 gradually increases along the winding direction. Of these, the thermoplastic resin feedstock having relatively low temperature and high viscosity immediately after input from the hopper passes through an area in which the protrusion height Hf is low, of the inclined surface portion 132, that is, a rear end portion in the axial direction of the inclined surface portion 132. In this case, since a relatively wide gap is secured between the inclined surface portion 132 and the inner wall surface 421 of the injection cylinder 42, the thermoplastic resin feedstock is not subjected to a strong shear force from the screw 10. In this way, occurrence of excessive breakage in the reinforcement fibers can be prevented.

On the other hand, the thermoplastic resin feedstock having relatively high temperature and low viscosity due to thermal energy sufficiently applied during transportation to the leading end side of the screw 10 passes through an area in which the protrusion height Hf2 is high, of the inclined surface portion 132, that is, a leading end portion in the axial direction of the inclined surface portion 132. In this case, since the gap between the inclined surface portion 132 and the inner wall surface 421 of the injection cylinder 42 is made relatively narrow, effective shear force and stretching force are loaded from the screw 10 to the thermoplastic resin feedstock. In this way, disaggregation or dispersion of the reinforcement fibers contained in the thermoplastic resin is promoted.

In addition, as described above, if the melting start position of the thermoplastic resin feedstock changes to the axially leading end side or the axially rear end side of the screw 10 depending on external disturbance such as a change in environmental condition, a difference occurs in a breakage state or the like of the reinforcement fiber, whereby there is a defect that variation occurs in the quality of the melted thermoplastic resin. However, as described above, the flat surface portion 131 is provided on the axially rear end side of the sub-flight 13 and a wide gap having a constant thickness is secured between the flat surface portion 131 and the inner wall surface 421 of the injection cylinder 42. Therefore, even if a melting start position of the thermoplastic resin feedstock changes to the screw leading end side or the screw rear end side depending on external disturbance such as an environmental condition, a difference does not occur in the protrusion height Hf1 (the thickness of the gap) of the sub-flight 13 that the thermoplastic resin which has started to melt should flow over. In this way, in addition to being able to prevent excessive breakage of the reinforcement fibers, occurrences of variation in the quality of the melted thermoplastic resin can be reduced.

Further, in the screw 10 of this embodiment, the difference S1 in protrusion height between the flat surface 131 of the sub-flight 13 and the main flight 12 is made to have a magnitude greater than or equal to the weight-average fiber length of a reinforcement fiber needed for a molded product. Therefore, the reinforcement fibers each having a weight-average fiber length needed for a molded product can pass through the gap between the inner wall surface 421 of the injection cylinder 42 and the flat surface portion 131 without being bent or to the extent of performing restorable bending deformation. In this way, occurrence of excessive breakage in the reinforcement fibers can be prevented, and thus the distribution state of residual fiber lengths in a molded product can be attained in which a molded product having a needed weight-average fiber length is provided.

(Second Embodiment)

Next, the configuration of a plasticizing screw for injection molding 10 (hereinafter simply referred to as a "screw 10") according to a second embodiment of the invention will be described. If the screw 10 according to the second embodiment is compared with the screw 10 according to the first embodiment, only the configuration of a sub-flight 15 is different. Since other configurations are the same as those in the first embodiment, the same reference numerals are used and a description thereof is omitted here.

Figure 5:
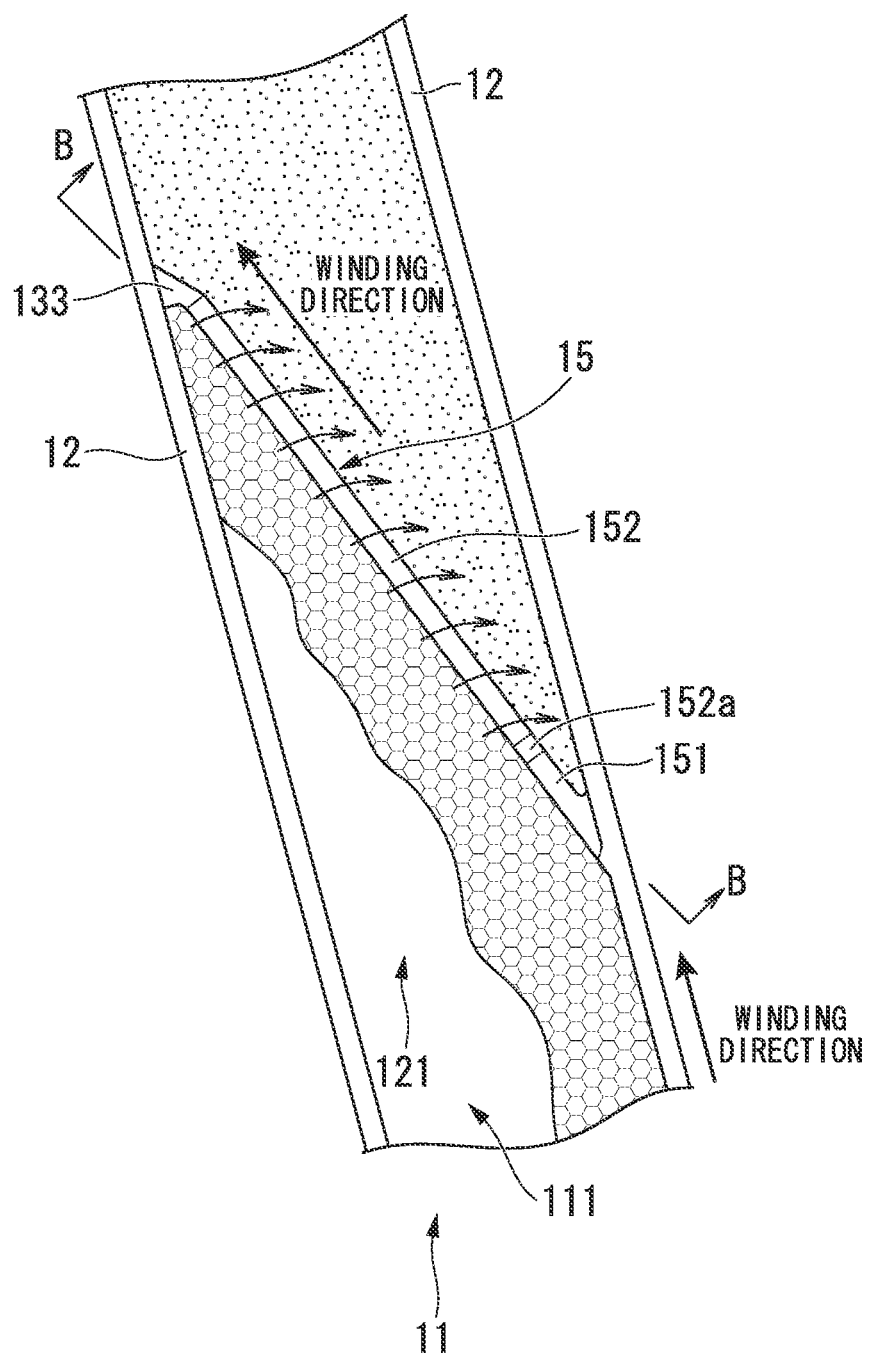
FIG. 5 is a development diagram illustrating an area provided with a sub-flight in a shaft according to a second embodiment.
Figure 6:
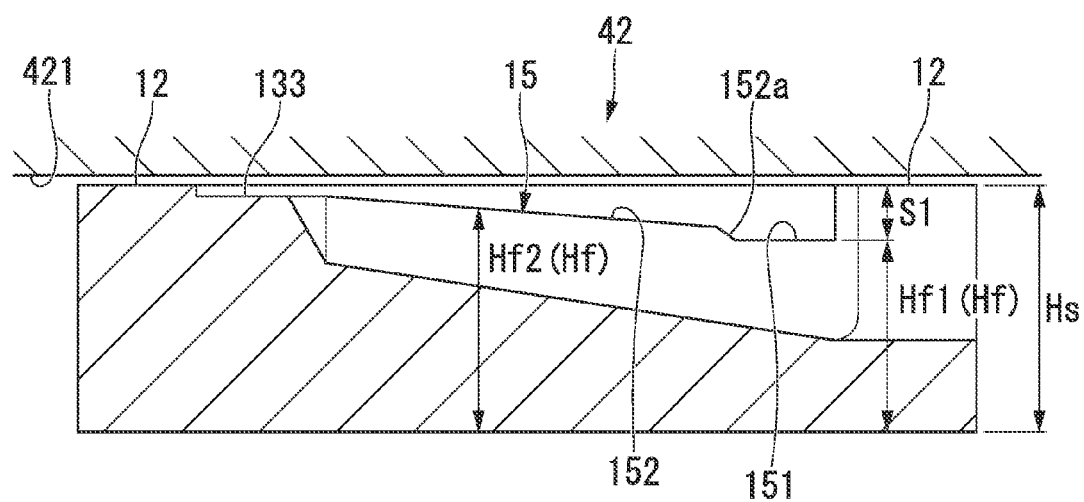
FIG. 6 is a schematic cross-sectional view illustrating a B-B cross-section in FIG. 5.

Here, FIG. 5 is a development diagram illustrating an area provided with the sub-flight 15 in the shaft 11. Further, FIG. 6 is a schematic cross-sectional view illustrating a B-B cross-section in FIG. 5.

The sub-flight 15 has a surface portion 151 provided at a rear end portion in the winding direction and an inclined surface portion 152 provided so as to extend continuously from a leading end in the winding direction of the flat surface portion 151, similarly to the sub-flight 13 of the first embodiment. However, the sub-flight 15 is different from the sub-flight 13 of the first embodiment in that a steep slope area 152a where the ratio at which the protrusion height Hf increases is larger than in other areas is provided at a portion which is a rear end portion in the winding direction of the inclined surface portion 152 and is connected to the flat surface portion 151. In addition, since other configurations of the sub-flight 15 are the same as those of the sub-flight 13 of the first embodiment, a description thereof is omitted here.

Next, the operation and effects of the screw 10 according to the second embodiment of the invention will be described. In the screw 10 of this embodiment, the steep slope area 152a is provided at a rear end portion in an axial direction of the inclined surface portion 152 constituting the sub-flight 15. In this way, the gap between the inner wall surface 421 of the injection cylinder 42 and the inclined surface portion 152 of the sub-flight 15 starts to become thin from the further rear end side in the axial direction, compared to the first embodiment in which there is no steep slope area 152a, and also the thickness of the gap as a whole is thin. Therefore, effective shear force and stretching force are loaded early to the thermoplastic resin which has started to melt. In this way, disaggregation or dispersion of the reinforcement fibers is further promoted. In addition, with respect to the same configurations as those in the first embodiment, the same effects are attained. However, a description thereof is omitted here.

EXAMPLES

Next, examples of the invention will be described. The applicant performed injection molding by using thermoplastic resin containing reinforcement fibers, with respect to a plurality of examples in which the conditions shown below were appropriately changed, and confirmed the quality of a molded product for each example.

(1) Injection molding machine used: 1050em-100 manufactured by Mitsubishi Heavy Industries Plastic Technology Co., Ltd., screw diameter: 90 mm (2) Thermoplastic resin feedstock used: polypropylene (PP)

(3) The reinforcement fiber: a glass fiber or a carbon fiber (4) The reinforcement fiber content ratio: 20% by weight or 30% by weight (5) The fiber length of the reinforcement fiber which is contained in the thermoplastic resin feedstock: 10 mm, 20 mm, or 25 mm (6) The shape of a molded product: a casing having an outer shape of 1000 mm×300 mm×15 mm and a thickness of 2 mm (7) Molding temperature: 230° C.

(8) Preheating temperature of the thermoplastic resin feedstock: 80° C.

(9) The weight-average fiber length of the reinforcement fiber: A test specimen of a square shape in a range of 60 mm square to 100 mm square is cut away from an optional place of a molded product. Then, the test specimen is heated for a given period of time at a temperature equal to or higher than the decomposition temperature of the thermoplastic resin, whereby the resin content is incinerated and removed, thereby making only the reinforcement fibers remain. Thereafter, the test specimen having only the reinforcement fibers is dispersed in an appropriate liquid medium and the lengths of 700 to 1000 reinforcement fibers are measured using image processing or the like. Then, a weight-average fiber length is calculated from the measured lengths of individual reinforcement fibers by using the following expression. Here, in the expression, Li means the measured fiber length of the reinforcement fiber and Qi means the number of reinforcement fibers having a fiber length of Li.

[Weight-average fiber length]=$(\Sigma Qi \times Li^2)/(\Sigma Qi \times Li)$

(10) The degree of dispersion of the reinforcement fibers: Where the degree of dispersion of fibers is poor, since a bundle of fibers is exposed on the surface of a molded product, evaluation of the degree of dispersion of fibers was evaluated into A, B, and C according to the external appearance states of the molded product.

A: There is no exposure of a bundle of fibers on the surface of the molded product and the glossiness of the surface of the molded product is high.

B: Although there is no exposure of a bundle of fibers on the surface of the molded product, the glossiness of the surface of the molded product is low.

C: A bundle of fibers is exposed on at least a portion of the surface of the molded product.

Here, FIG. 7 is a table illustrating the test results regarding each example. According to the results of Examples 1 to 6, by carrying out the invention, even in a case where the states of the thermoplastic resin feedstock are different, and more specifically, even in a case where the presence or absence of preheating, the reinforcement fiber content ratio, or the fiber length of the reinforcement fiber is different, the weight-average fiber length of the reinforcement fiber in a molded product which is greater than or equal to 1.0 mm was obtained (generally, in a pellet containing reinforcement fibers, in order to obtain the long fiber-specific effect of improving mechanical strength, the weight-average fiber length of the reinforcement fiber which remains in a molded product needs to be greater than or equal to 1.0 mm).

In addition, if the results of Examples 5 and 6 shown in FIG. 7 are compared with each other, it is shown that if the fiber length of the reinforcement fiber which is contained in the thermoplastic resin feedstock exceeds 20 mm, the weight-average fiber length of the reinforcement fiber which remains in a molded product becomes constant. From this, in order to more clearly obtain the effects of the invention, it is preferable to make the fiber length of the reinforcement fiber be greater than or equal to 1.0 mm and less than or equal to 20 mm.

Further, in Examples 7 to 9 shown in FIG. 7, the difference S1 in protrusion height between the flat surface portion 131 of the sub-flight 13 and the leading end portion in the radial direction of the main flight 12 is changed. If these results are compared with each other, it is shown that the smaller the difference S1 in protrusion height is made, the smaller the weight-average fiber length of the reinforcement fiber which remains in a molded product becomes, and breakage of the reinforcement fibers is increased. From this, in order to stably obtain 1.0 mm that is a weight-average fiber length required to improve the mechanical strength of a resin molded product, it is preferable to make the difference S1 in protrusion height be greater than or equal to 1.5 mm.

Further, Comparative Examples 1 and 2 shown in FIG. 7 show a case where the sub-flight 13 is composed of only the inclined surface portion 132 without having the flat surface portion 131, and the protrusion height Hf2 at the lowermost position of the inclined surface portion 132 is changed. If Comparative Examples 1 and 2 are respectively compared with Examples 7 and 8, it is shown that in a case where the flat surface portion 131 is not provided in the sub-flight 13, excessive breakage occurs in the reinforcement fibers, whereby the weight-average fiber length of the reinforcement fiber which remains in a molded product falls below 1.0 mm. In this case, the effect of a reinforcement fiber of improving mechanical strength is not obtained in a molded product.

Industrial Applicability

In the plasticizing screw for injection molding according to the invention, the sub-flight includes the flat surface portion which is provided on the rear end side in the winding direction and in which the protrusion height from the circumferential surface of the shaft is lower than that of the main flight and is constant, and the inclined surface portion in which the protrusion height from the circumferential surface of the shaft gradually increases toward the leading end side in the winding direction and is less than the protrusion height of the main flight.

According to such a configuration, at the rear end side in the winding direction of the screw, a wide gap having a constant width is secured between the inner wall surface of the injection cylinder and the flat surface portion of the sub-flight. In this way, occurrence of excessive breakage in the reinforcement fibers can be prevented while promoting disaggregation or dispersion of the reinforcement fibers contained in the thermoplastic resin feedstock, regardless of the type of resin or the operating condition of the screw.

Reference Signs List

1: injection molding machine
2: cavity
3: mold unit
4: injection unit
10: plasticizing screw for injection molding
11: shaft
12: main flight
13: sub-flight
14: head
15: sub-flight
31: fixed mold 32: movable mold
41: unit main body
42: injection cylinder
43: hopper
44: connecting shaft
45: motor
46: piston
47: hydraulic piping
111: circumferential surface
121: groove portion
131: flat surface portion
132: inclined surface portion
133: connection area
151: flat surface portion
152: inclined surface portion
411: hydraulic oil cylinder
421: inner wall surface
152a: steep slope area
Hf: protrusion height (sub-flight)
Hf1: protrusion height (flat surface portion)
Hf2: protrusion height (inclined surface portion)
Hs: protrusion height (main flight)
Pf: pitch (sub-flight)
Ps: pitch (main flight)
S1: difference (in protrusion height)

The invention claimed is:

1. A plasticizing screw for injection molding that is installed in an injection molding machine which performs injection molding by plasticizing thermoplastic resin feedstock containing reinforcement fibers, the plasticizing screw for injection molding comprising:
   a shaft which is rotationally driven;
   a main flight spirally provided on the circumferential surface of the shaft; and
   a sub-flight spirally provided on the circumferential surface of the shaft and in a groove portion of the main flight,
   wherein the protrusion height of the main flight from the circumferential surface of the shaft is formed to be constant in at least an area in which the sub-flight is provided,
   the sub-flight includes
   a flat surface portion which is provided on a rear end side in a winding direction and in which a protrusion height from the circumferential surface of the shaft is lower than the protrusion height of the main flight and is constant, and
   an inclined surface portion which is provided to extend continuously from a leading end in the winding direction of the flat surface portion and in which a protrusion height from the circumferential surface of the shaft gradually increases toward a leading end side in the winding direction and is less than the protrusion height of the main flight, and
   a connection portion between the flat surface portion and the inclined surface portion of the sub-flight is provided further to the rear end side than a central portion in the winding direction of the sub-flight.

2. The plasticizing screw for injection molding according to claim 1, wherein a difference in protrusion height between the main flight and the flat surface portion of the sub-flight has a magnitude of greater than or equal to 1.5 mm.

3. The plasticizing screw for injection molding according to claim 1, wherein the connection portion between the inclined surface portion and the flat surface portion is of a step shape in which the protrusion height of the inclined surface portion is higher than the protrusion height of the flat surface portion.

4. The plasticizing screw for injection molding according to claim 3, wherein the step shape is a steep slope shape in which a ratio at which its protrusion height increases is larger than that of the inclined surface portion.

5. The plasticizing screw for injection molding according to claim 2, wherein the connection portion between the inclined surface portion and the flat surface portion is of a step shape in which the protrusion height of the inclined surface portion is higher than the protrusion height of the flat surface portion.

6. The plasticizing screw for injection molding according to claim 5, wherein the step shape is a steep slope shape in which a ratio at which its protrusion height increases is larger than that of the inclined surface portion.

7. An injection molding method comprising:
   a process of plasticizing thermoplastic resin feedstock containing reinforcement fibers by using a plasticizing screw for injection molding; and
   a process of injecting the plasticized thermoplastic resin feedstock into a cavity of a mold,
   wherein the plasticizing screw for injection molding is a plasticizing screw for injection molding which includes
   a shaft which is rotationally driven,
   a main flight spirally provided on the circumferential surface of the shaft, and
   a sub-flight spirally provided on the circumferential surface of the shaft and in a groove portion of the main flight,
   wherein the protrusion height of the main flight from the circumferential surface of the shaft is formed to be constant in at least an area in which the sub-flight is provided,
   the sub-flight includes
   a flat surface portion which is provided on a rear end side in a winding direction and in which a protrusion height from the circumferential surface of the shaft is lower than the protrusion height of the main flight and is constant, and
   an inclined surface portion which is provided to extend continuously from a leading end in the winding direction of the flat surface portion and in which a protrusion height from the circumferential surface of the shaft gradually increases toward a leading end side in the winding direction and is less than the protrusion height of the main flight, and
   a connection portion between the flat surface portion and the inclined surface portion of the sub-flight is provided further to the rear end side than a central portion in the winding direction of the sub-flight.

* * * * *